United States Patent
Langhammer et al.

(10) Patent No.: US 12,511,122 B2
(45) Date of Patent: Dec. 30, 2025

(54) HAZARD MITIGATION FOR LIGHTWEIGHT PROCESSOR CORES

(71) Applicant: Intel Corporation, Santa Clara, CA (US)

(72) Inventors: Martin Langhammer, Alderbury (GB); Gregg William Baeckler, San Jose, CA (US)

(73) Assignee: Altera Corporation, San Jose, CA (US)

(*) Notice: Subject to any disclaimer, the term of this patent is extended or adjusted under 35 U.S.C. 154(b) by 874 days.

(21) Appl. No.: 16/875,804

(22) Filed: May 15, 2020

(65) Prior Publication Data
US 2020/0278865 A1   Sep. 3, 2020

(51) Int. Cl.
*G06F 9/30*   (2018.01)
*G06F 8/41*   (2018.01)
*G06F 9/38*   (2018.01)
*G06F 15/78*  (2006.01)

(52) U.S. Cl.
CPC ............ *G06F 9/30076* (2013.01); *G06F 8/44* (2013.01); *G06F 9/30058* (2013.01); *G06F 9/30098* (2013.01)

(58) Field of Classification Search
CPC ...... G06F 8/44; G06F 9/3836; G06F 9/30058; G06F 9/30076; G06F 9/30185; G06F 9/30098; G06F 9/30079; G06F 8/443
USPC ....................................................... 712/233
See application file for complete search history.

(56) References Cited

U.S. PATENT DOCUMENTS

| | | | |
|---|---|---|---|
| 5,117,493 A * | 5/1992 | Jensen | G06F 9/3824 711/140 |
| 5,515,519 A | 5/1996 | Yoshioka et al. | |
| 6,370,638 B1 * | 4/2002 | Yamasaki | G06F 9/3867 712/E9.035 |
| 6,438,680 B1 | 8/2002 | Yamada et al. | |
| 6,751,759 B1 * | 6/2004 | Sun | G06F 11/0721 714/E11.005 |
| 6,772,370 B1 * | 8/2004 | Sun | G06F 11/3684 712/216 |
| 7,210,024 B2 | 4/2007 | McIlvaine et al. | |
| 7,734,899 B2 | 6/2010 | Crook et al. | |
| 2005/0289326 A1 | 12/2005 | Lea | |
| 2006/0015855 A1 * | 1/2006 | Kumamoto | G06F 8/443 717/136 |
| 2006/0200654 A1 | 9/2006 | Dieffenderfer et al. | |
| 2008/0229028 A1 * | 9/2008 | Cascaval | G06F 8/4442 711/141 |
| 2010/0050026 A1 | 2/2010 | Okabe | |

(Continued)

*Primary Examiner* — Chun Kuan Lee
(74) *Attorney, Agent, or Firm* — Fletcher Yoder, P.C.

(57) ABSTRACT

Integrated circuits that include lightweight processor cores are provided. Each processor core may be configured to execute a series of instructions. At least one of the instructions may include an embedded delay field with a value specifying the amount of time that instruction needs to wait before proceeding to the next instruction to avoid a data hazard. The value of the delay field may be determined by a compiler during software compile time. Such delay field may also be used in conjunction with branch instructions to specify a number of no-operations (NOPs) for one or more associated branch delay slots and may also be used to reduce data forwarding cost.

21 Claims, 13 Drawing Sheets

(56) References Cited

U.S. PATENT DOCUMENTS

| | | | |
|---|---|---|---|
| 2014/0351551 A1* | 11/2014 | Doerr | G06F 9/30083 |
| | | | 711/204 |
| 2016/0378715 A1* | 12/2016 | Kang | G06F 15/8061 |
| | | | 712/2 |
| 2020/0249945 A1* | 8/2020 | Tabuchi | G06F 9/30079 |
| 2021/0263841 A1* | 8/2021 | Mo | G06F 11/3688 |

* cited by examiner

1002 { Add 1    LDW    ra, 16(sp)

1004 { Add 2    LDW    r17, 12(sp)

1006 { Add 3    LDW    r16, 8(sp)
⋮

FIG. 10A

HAZARD MITIGATION FOR LIGHTWEIGHT PROCESSOR CORES

BACKGROUND

Integrated circuits are often provided with one or more lightweight processors such as reduced instruction set computer (RISC) processors. During normal operation, a RISC processor may execute a series of instructions. A common issue associated with RISC processors during execution time is data hazards. A "data hazard" refers to a situation where data is required for a computation but that required data is still in-flight and not yet available.

One conventional way of mitigating data hazards is to use hardware to compare the current instruction decode (i.e., by monitoring the destination and source registers in the current instruction) with the current register indices in the register pipeline. If a hazard is detected, the top of the pipeline is frozen or disabled until the required writeback is complete. Such hazard detection hardware can be quite large and can take up significant area in the RISC processor.

It is also possible to insert a no-operation (or "NOP") in situations where it is unsafe to proceed to the next instruction to prevent any meaningful action from taking place for a clock cycle. If n stalling clock cycles are needed, then n explicit NOP instruction words will be required. These n separate NOP instructions will have to be stored in the program memory, which can take up valuable memory space.

Another way of mitigating data hazards without significant area overhead is to implement a single fixed execution time (i.e., to simply set the time required for all operation to be equal the time needed to avoid the absolute worst case data hazard). For example, in a 5-stage pipelined processor, every instruction will be scheduled for 5 clock cycles irrespective of the existence of a hazard. Typically, a simple RISC processor issues one instruction per cycle even though the retired instructions per second (IPS) may be less than one. Operating processors in this way, however, severely reduces instruction throughput.

It is within this context that the embodiments described herein arise.

BRIEF DESCRIPTION OF THE DRAWINGS

FIG. 10A is a diagram showing a series of load word instructions in accordance with an embodiment.

DETAILED DESCRIPTION

The present embodiments relate to methods and apparatus for mitigating data hazards on a processor core. The processor core may execute a series of instructions generated using a software compiler. Predetermined delay settings for preventing data hazards can be statically scheduled by the software compiler by coding a desired amount of wait time into a dedicated/unused field in each instruction word. Alternatively, the desired wait time may be coded in a dedicated multicycle no-operation (NOP) instruction following each instruction. Implementing instruction delay in this way can yield data hazard resistant lightweight processor cores with small area and improved throughput while reducing data forwarding cost and taking advantage of available branch delay slots (if any).

It will be recognized by one skilled in the art, that the present exemplary embodiments may be practiced without some or all of these specific details. In other instances, well-known operations have not been described in detail in order not to unnecessarily obscure the present embodiments.

Integrated circuits such as programmable integrated circuits often include multiple lightweight processor cores. In comparison to processor cores implemented on an application-specific integrated circuit (ASIC) die, processor cores implemented on a programmable integrated circuit tend to operate with higher levels of pipelining and thus encounter data hazards more often and have more difficulty tolerating the area and delay penalties associated with forwarding multiplexers. Memory blocks on a programmable integrated circuit are often of a fixed predetermined size, so increasing memory depth requires instantiating another entire memory block, which would require additional multiplexing of the instruction memory to combine them. Multiplexers are slow, which requires additional pipelining and which in turn creates an even longer hazard, perpetuating a vicious circle that is deleterious to the overall performance and function of the device.

The embodiments described herein for mitigating data hazards on a programmable integrated circuit die may therefore sometimes be described herein as an example. This is, however, merely illustrative. If desired, the present methods and circuitry may be implemented on application specific standard products (ASSPs), application specific integrated circuits (ASICs), microcontrollers, microprocessors, central processing units (CPUs), graphics processing units (GPUs), or other suitable types of integrated circuit devices.

Figure 1:
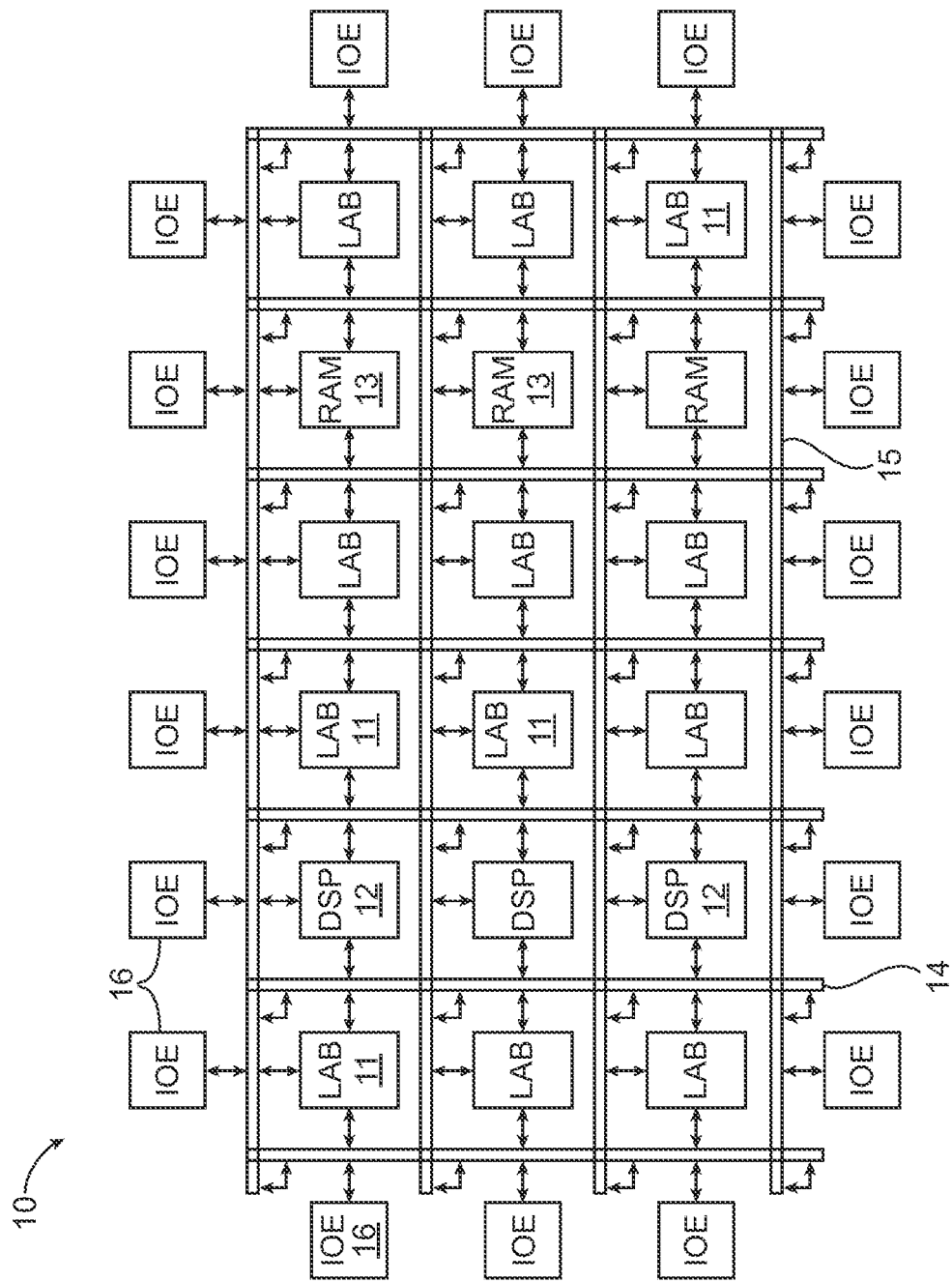
FIG. 1 is a diagram of an illustrative programmable integrated circuit in accordance with an embodiment.

FIG. 1 is a diagram of a programmable integrated circuit 10 that includes arithmetic logic and random logic. Programmable integrated circuit 10 may be a programmable logic device (PLD). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. As shown in FIG. 1, device 10 may include a two-dimensional array of functional blocks, including logic array blocks (LABs) 11 and other functional blocks, such as random access memory (RAM) blocks 13 and specialized processing blocks such as digital signal processing (DSP) blocks 12 that are partly or fully hardwired to perform one or more specific tasks such as mathematical/arithmetic operations.

Functional blocks such as LABs 11 may include smaller programmable regions (e.g., logic elements, configurable logic blocks, or adaptive logic modules) that receive input signals and perform custom functions on the input signals to produce output signals. Device 10 may further include programmable routing fabric that is used to interconnect LABs 11 with RAM blocks 13 and DSP blocks 12. The combination of the programmable logic and routing fabric is sometimes referred to as "soft" logic, whereas the DSP blocks are sometimes referred to as "hard" logic. The type of hard logic on device 10 is not limited to DSP blocks and may include other types of hard logic Adders/subtractors, multipliers, dot product computation circuits, and other arithmetic circuits which may or may not be formed as part of a DSP block 12 may sometimes be referred to collectively as "arithmetic logic."

Programmable logic device 10 may contain programmable memory elements for configuring the soft logic. Memory elements may be loaded with configuration data (also called programming data) using input/output elements (IOEs) 16. Once loaded, the memory elements provide corresponding static control signals that control the operation of one or more LABs 11, programmable routing fabric, and optionally DSPs 12 or RAMs 13. In a typical scenario, the outputs of the loaded memory elements are applied to the gates of metal-oxide-semiconductor transistors (e.g., pass transistors) to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc. The logic gates and multiplexers that are part of the soft logic, configurable state machines, or any general logic component not having a single dedicated purpose on device 10 may be referred to collectively as "random logic."

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), programmable metallization cells (PMCs), conductive-bridging RAM (CBRAM), resistive memory elements, combinations of these structures, etc. Because the memory elements are loaded with configuration data during programming, the memory elements are sometimes referred to as configuration memory, configuration RAM (CRAM), configuration memory elements, or programmable memory elements.

In addition, programmable logic device 10 may use input/output elements (IOEs) 16 to drive signals off of device 10 and to receive signals from other devices. Input/output elements 16 may include parallel input/output circuitry, serial data transceiver circuitry, differential receiver and transmitter circuitry, or other circuitry used to connect one integrated circuit to another integrated circuit. As shown, input/output elements 16 may be located around the periphery of the chip. If desired, the programmable logic device may have input/output elements 16 arranged in different ways.

The routing fabric (sometimes referred to as programmable interconnect circuitry) on PLD 10 may be provided in the form of vertical routing channels 14 (i.e., interconnects formed along a vertical axis of PLD 10) and horizontal routing channels 15 (i.e., interconnects formed along a horizontal axis of PLD 10), each routing channel including at least one track to route at least one wire. If desired, the functional blocks of device 10 may be arranged in more levels or layers in which multiple functional blocks are interconnected to form still larger blocks. Other device arrangements may use functional blocks that are not arranged in rows and columns.

Figure 2:
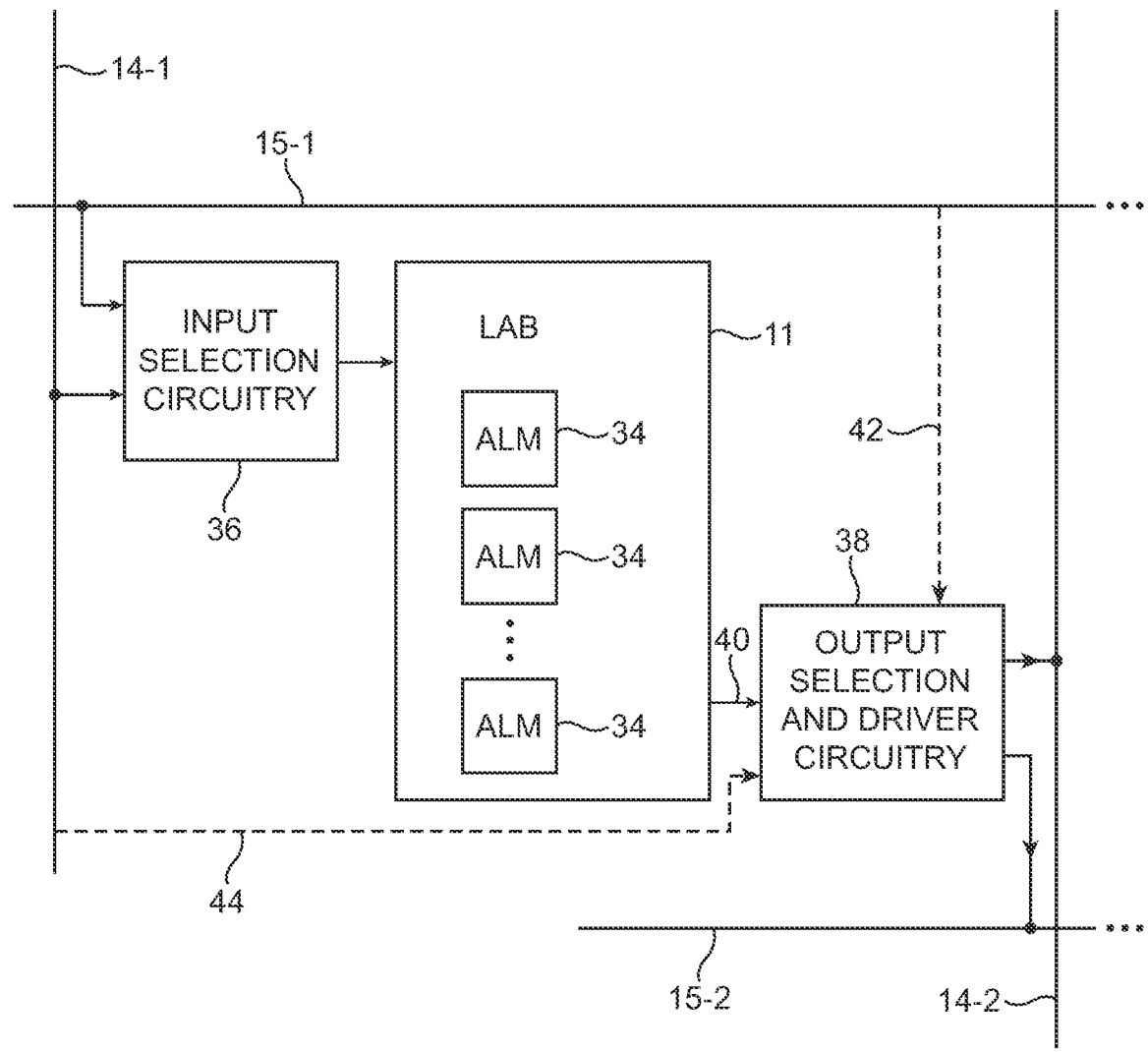
FIG. 2 is a diagram of an illustrative programmable logic block in accordance with an embodiment.

An illustrative programmable logic region 11 including a group of multiple smaller logic regions 34 is shown in FIG. 2. Programmable logic region 11, sometimes referred to as a logic array block (LAB), may have associated input selection circuitry 36 and output selection and driver circuitry 38. Input selection circuitry 36 and output selection and driver circuitry 38 may be formed as part of routing paths 14 and 15 or as part of input-output circuits such as input-output circuits 12 of FIG. 1.

Input selection circuitry 36 may receive input signals via a first set of horizontal interconnects 15-1 and a first set of vertical interconnects 14-1. For example, interconnects 15-1 may provide input signals to programmable logic block 11 from other programmable logic blocks 11 in the same row or from input/output pins 16, whereas interconnects 14-1 may provide input signals to programmable logic block 11 from other logic blocks 11 in the same column or from pins 16. Input selection circuitry 36 may be configured (e.g., by programming CRAM bits that are associated with input selection circuitry 36) to select one or more of the input signals to provide to programmable logic block 11.

As shown in FIG. 2, LAB 11 may include smaller regions of programmable logic 34. The smaller programmable logic regions 34 within each programmable logic region 11 are sometimes referred to as "adaptive logic modules" (ALMs), "logic elements," or "logic cells." Logic cells 34 may receive the input signals that are selected by input selection circuitry 36 and may perform custom functions on the input signals to produce output signals. The input signals received by each logic cell 34 may overlap with input signal portions received by other logic cells 34 (e.g., some of the input signals received by a first logic cell 34 may also be received by a second logic cell 34). There may be any suitable number of logic cells 34 within logic block 11. In general, each logic cell or ALM 34 may be a native element on device 10 that includes a group of lookup table (LUT) circuits and associated registers, which can be collectively configured to implement logic gates or even arithmetic circuits.

The output signals may be provided to output selection and driver circuitry 38 via output paths 40. Output selection and driver circuitry 38 may receive output signals via paths 40 and may be configured to provide the output signals to a second set of horizontal interconnects 15-2 and a second set of vertical interconnects 14-2.

If desired, output selection circuitry 38 may be configured to disconnect one or more of interconnects 15-2 or 14-2 (e.g., by providing no output signal or by providing a high impedance output). If desired, output selection circuitry 38 may be configured to provide a given output signal to multiple interconnects. For example, it may be desirable to route an output signal from a given logic cell 34 to two different regions on integrated circuit 10. In this scenario, output selection and driver circuitry 38 may provide that output signal to two different interconnects of different lengths.

In some arrangements, input selection circuitry 36 may include LAB input multiplexers (LIMs) that can be used to select signals from a horizontal channel, a vertical channel, and local outputs from one or more logic cells 34 and to drive a set of LAB lines. The input selection circuitry 36 may also include logic element input multiplexers (LEIMs) that can be used to select signals from some set of LAB lines and to drive the selected signals to logic cells 34. Output selection circuitry 38 may include driver input multiplexers (DIMs) that can be used to select signals from a horizontal channel, a vertical channel, and local outputs from one or more logic elements and to drive wires, which originate in that logic block 11 and route to other logic blocks 11.

Figure 3:
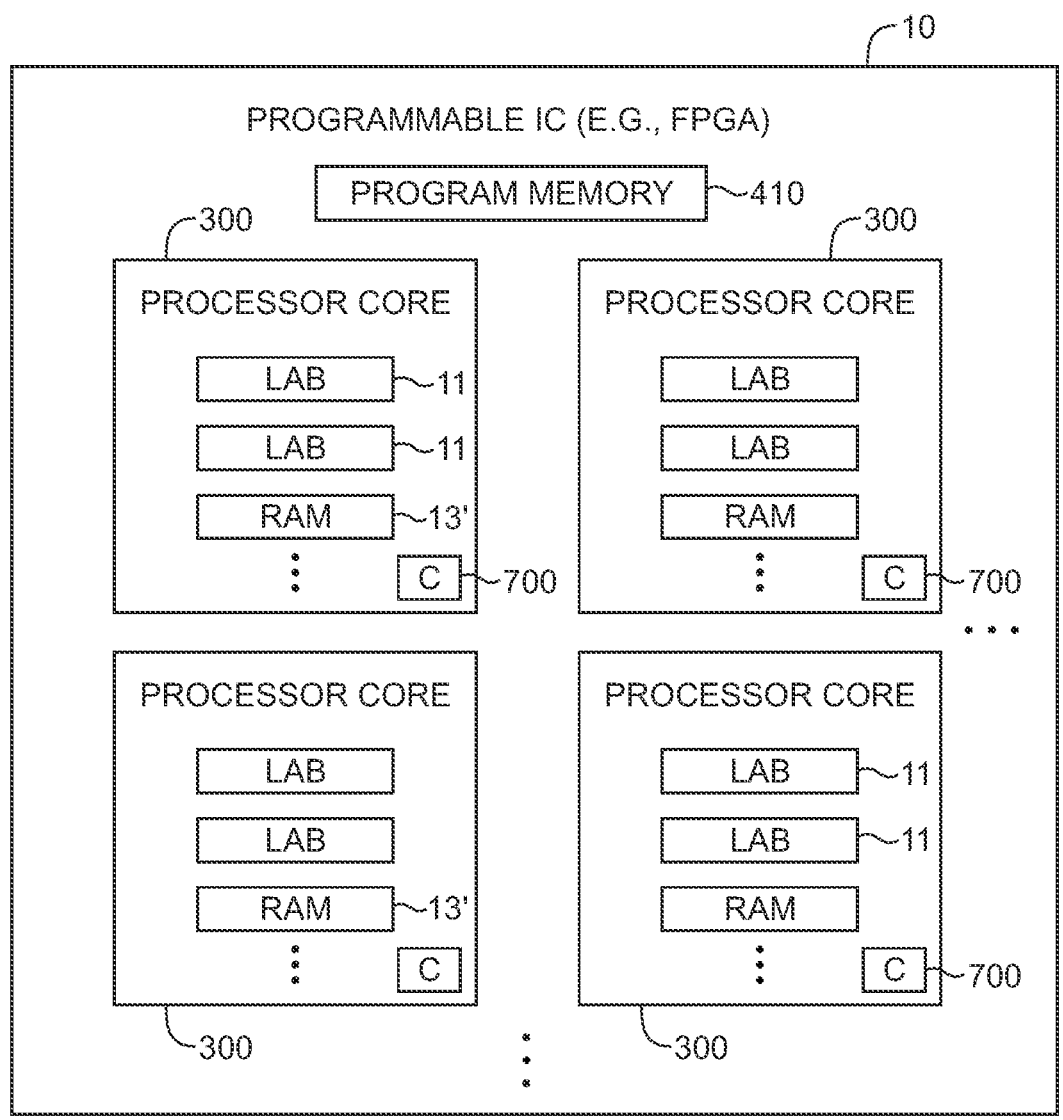
FIG. 3 is a diagram showing how a programmable integrated circuit may include multiple processor cores in accordance with an embodiment.

FIG. 3 is a diagram showing how programmable integrated circuit 10 (e.g., a field-programmable gate array or FPGA) may include multiple processor cores 300. Each processor core 300 (sometimes referred to as a soft processor, soft microprocessor, or a soft processor core) may be a programmable/reconfigurable microprocessor core than can be wholly implemented using logic synthesis. An example of soft processor core 300 may be a lightweight processor core such as a reduced instruction set computer (RISC) processor or the Nios® family of soft processors developed by Intel Corporation. Each soft processor may be at least partially implemented using programmable/reconfigurable logic circuitry.

As shown in FIG. 3, each processor core 300 may include multiple LABs 11 and one or more associated RAM blocks 13'. RAM block 13' may be a single or multiport synchronous random-access memory (RAM) block that can be used for storing processor code, implementing lookup schemes, or implementing large memory applications. If desired, the processor code (sometimes referred to application code or program code) of each processor core 300 may optionally be stored on separate program memory 410 on device 10.

The example of FIG. 3 in which FPGA 10 includes four soft processor cores 300 and where each soft processor 300 includes two LABs 11 and one RAM block 13' is merely illustrative. In general, device 10 may include any suitable number of processors 300 (e.g., tens, hundreds, or even thousands of processor cores), and each processor 300 may include at least two LABs, at least four LABs, at least eight LABs, more than 10 LABs, and any suitable number of associated RAM blocks each of which has the capacity to store thousands or millions of data bits.

Figure 4:
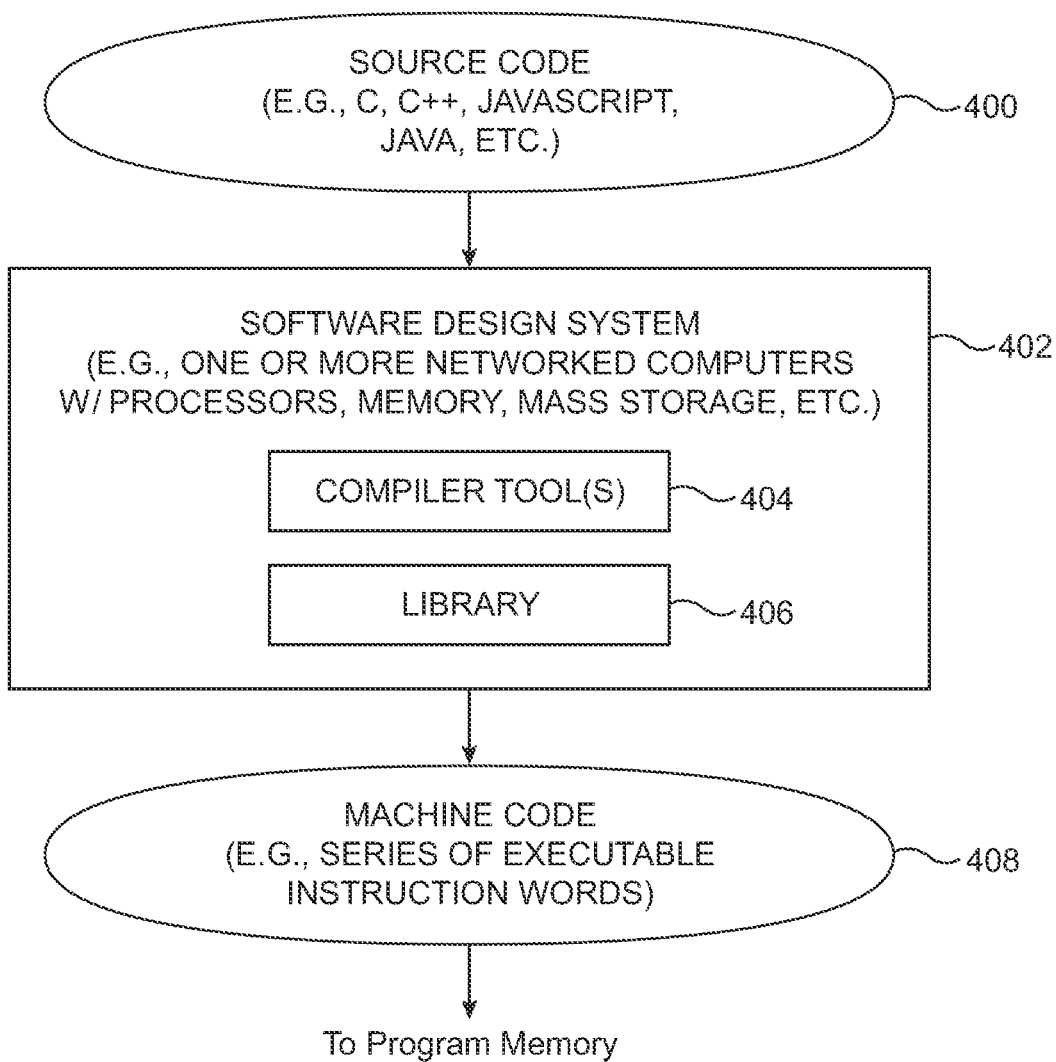
FIG. 4 is a diagram of an illustrative software compile operation in accordance with an embodiment.

The program code of each processor code 300 may be generated using a software design system such as software design system 402 shown in FIG. 4. Software design system 402 may be implemented on software design computing equipment, which may be based on one or more processors such as personal computers, workstations, etc. The processor(s) may be linked using a network (e.g., a local or wide area network). Memory in these computers or external memory and storage devices such as internal and/or external hard disks or non-transitory computer-read storage media may be used to store instructions and data.

Software-based components such as compiler tool(s) 404 and library 406 reside on system 402. During operation, a user may provide a source code 400 (e.g., a source code written in C, C++, JavaScript, Java, or other high level programming language) to compiler 404. Compiler 404 may, with the aid of runtime library files or other auxiliary information stored in library 406, then translate source code 400 from the high-level programming language to a lower level language. As shown in FIG. 4, software compiler 404 may generate a corresponding machine code 408, which is an executable program with a series of instruction words. Machine code 408 may sometimes be referred to as program code, software code, program instructions, instructions, script, or code. Machine code 408 may then be stored in a processor's program memory (e.g., in memory 13' or memory 410 in FIG. 3, non-volatile memory such as non-volatile random-access memory, one or more external hard drives, one or more removable flash drives or other removable media, or other suitable non-transitory computer readable storage media). The process of FIG. 4 is sometimes referred to as a software compile.

When building processors, there is a fundamental issue of needing to know exactly when the inputs to any given operation would be ready for use in a subsequent operation. For example, consider the following two consecutive instructions:

$R0=R1+R2$ $R3=R0+R4$ where the first instruction adds values R1 and R2 to obtain sum value R0, and where the second instruction adds values R0 and R4 to obtain sum value R3. The summing of R1 and R2 may take some time to compute and write back to storage, whether it be memory or register file. In the example above, the value of R0, however, is immediately required for use in the computer of R3. Most processors have pipeline registers, which enable multiple operations to execute concurrently in a pipelined fashion so that different operations will be in-flight at the same time in various stages of the register pipeline. The situation where data is required for a computation but is not yet available is referred to as a "data hazard."

To avoid or mitigate such data hazard, an instruction (i.e., the instruction requiring the in-flight data) may need to be temporarily suspended while the necessary piece of information propagates through the register pipeline to become ready for use. In accordance with an embodiment, each instruction word in a program may be provided with special bits that specify the number of clock cycles to spend on that instruction before continuing on to the next instruction. These special bits (sometimes referred to as "instruction delay bits" or the "wait state") may be part of a dedicated delay field that is otherwise unused. The delay field may have a value that specify that at least one NOP needs to be inserted after the instruction, that multiple NOPs has to be inserted after the instruction, or that no (zero) NOPs need to be inserted after the instruction. Unlike adding memory depth, which would typically require instantiating another entire memory block/page and may also require additional multiplexing of the instruction memory to combine them, adding on a few more bits to an instruction word is generally very cheap on an FPGA since FPGAs typically have a fixed wider memory width to begin with, approaching almost zero cost and delay. The software compiler tool that is used to generate the program/machine code may be used to determine the value of the delay field since, at software compile time, it is aware of the data flow and the various register states within the processor when running the program.

Figure 5:
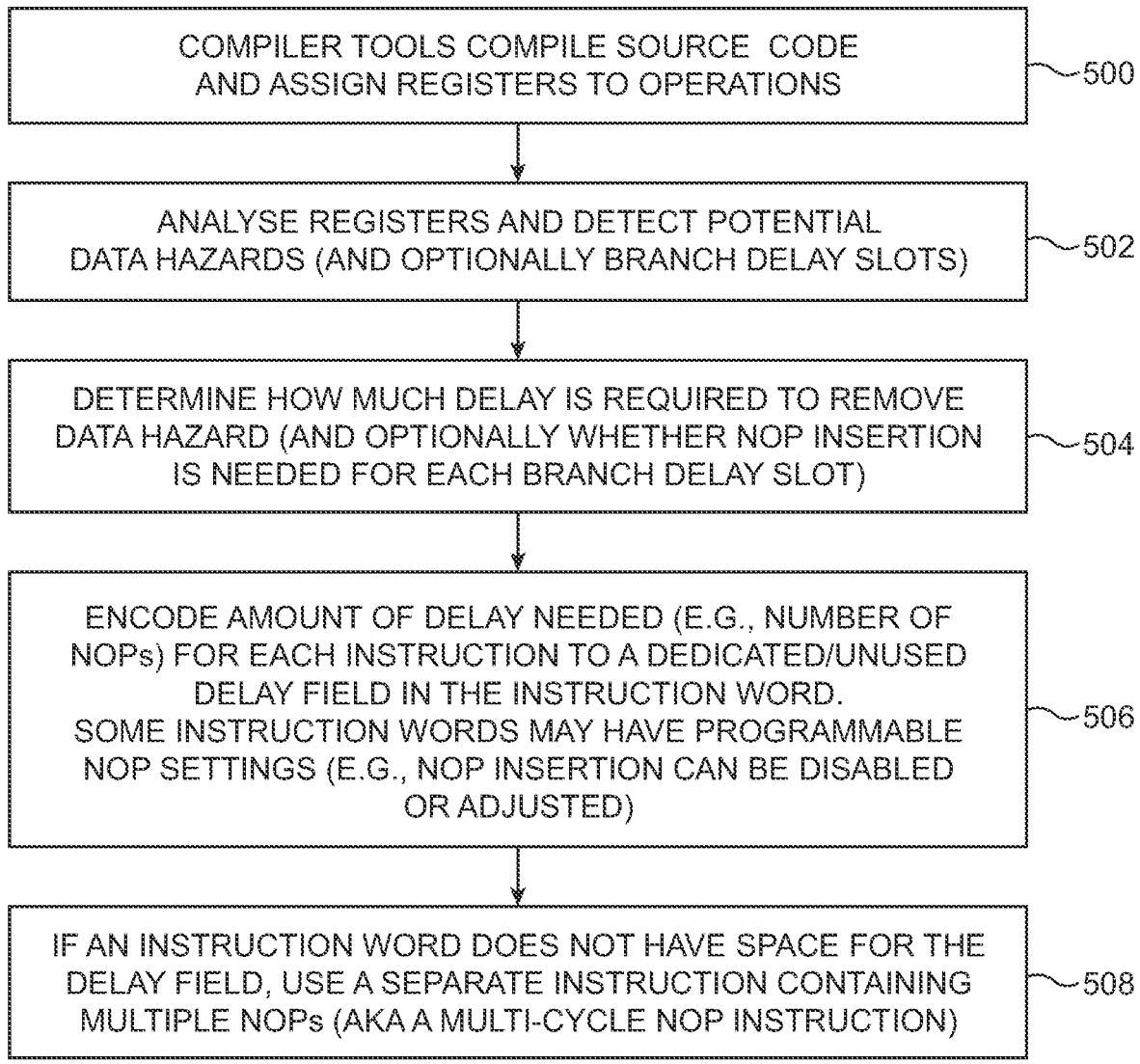
FIG. 5 is a flow chart of illustrative steps for statically encoding a wait state in an instruction word in accordance with an embodiment.

FIG. 5 is a flow chart of illustrative steps for statically encoding the wait state in an instruction word. At step 500, the software compiler (e.g., compiler tool(s) 404 of FIG. 4) may compile the high-level source code and assign registers to program operations to obtain the low-level machine code.

At step 502, the compiler may analyze the assigned registers and detect potential data hazards (e.g., by detecting whether any given instruction in the machine code requires data that is not yet available). During step 502, compiler 502 may also optionally detect for the presence of branch delay slots. In many RISC processor architectures, one or more branch delay slots exist immediately after a branch (or jump) instruction. The term "branch" and "jump" may refer to the same computer operation and can be used interchangeably. In such scenarios, one or more instructions immediately following the branch/jump instruction may still execute whether or not the branch is taken. This is an artifact of a deeply pipelined architecture where some additional instructions may already be in-flight even after a jump. Having to deal with branch delay slots typically greatly increases compiler complexity.

At step 504, the compiler may determine how much delay is required to remove the data hazard for each problematic instruction. During this step, the compiler may also optionally detect whether a NOP insertion is needed for each branch delay slot. If there is only a single branch delay slot, up to one NOP may be inserted after the jump instruction. If there is a multi-cycle branch delay slot, then one or more NOPs may be inserted after the jump instruction.

Figure 6A:
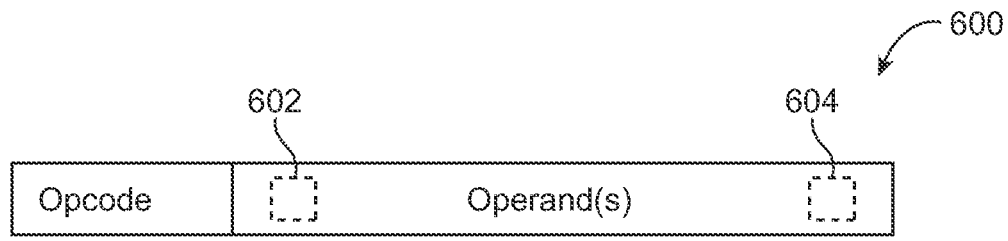
FIGS. 6A-6D are diagrams showing how a delay field can be located at different portions of an instruction word in accordance with certain embodiments.

At step 506, the compiler may encode the amount of requisite delay determined during step 504 in a dedicated or unused delay field in each problematic instruction word. FIG. 6A is a diagram of an illustrative instruction such as instruction word 600. As shown in FIG. 6A, instruction word 600 may have a first opcode portion with a first number of bits and a second operand portion with a second number of bits. The value of the opcode specifies the type of instruction, whereas the value of the operand may include a source register designation, destination register designation, shift amount, function code, offset value, immediate value, address label, or other information. The bit width of the opcode portion is typically greater than the bit width of the operand portion but this need not be the case.

Figure 6B:
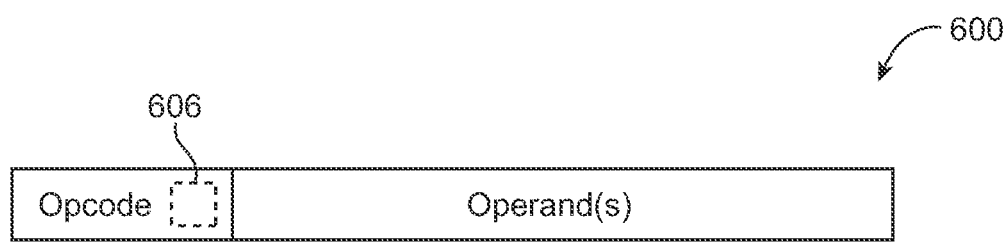
Figure 6C:
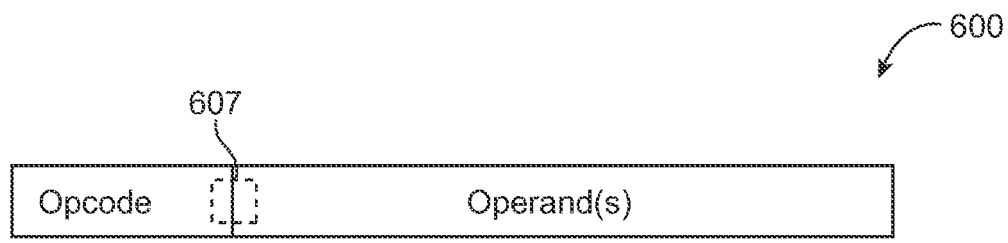

In the example of FIG. 6A, the delay field containing the instruction delay bits or the wait state may be included in some dedicated or unused portion of the operand (see portion 602 and/or portion 604 of the operand). FIG. 6B illustrates another suitable embodiment where the delay field is included in some dedicate or unused portion of the opcode (see portion 606 of the opcode). If desired, the delay field may even straddle the boundary between the opcode and the operand (see field 607 in FIG. 6C).

Figure 6D:
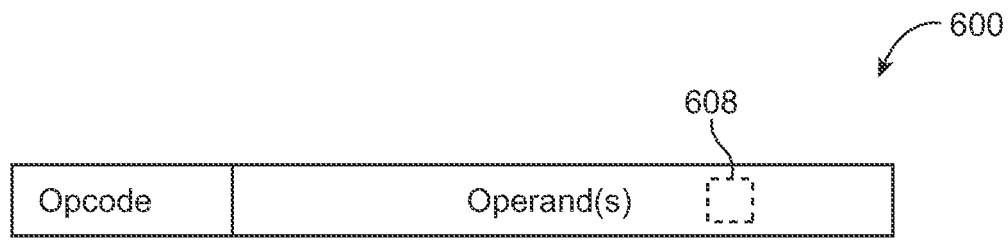

FIG. 6D illustrates yet another suitable embodiment where some instruction words may optionally be provided with a programmable NOP setting (see, e.g., a single bit 608 in the instruction word 600 may define whether NOP insertion is enabled or disabled). For example, consider a scenario where the processor architecture has branch delay slots. The NOP insertion feature may be selective disabled for instructions where it makes sense to put meaningful instructions in the branch delay slots (e.g., for putting a for-loop counter). A single bit may be sufficient because if the branch delay slot is not populated, the insertion bit will be asserted and a predetermined/fixed amount of delay (e.g., 3 cycles) will automatically be inserted. If the insertion bit is deasserted, no NOPs is inserted and some real code may be inserted in the branch delay slot. In general, the number of NOPs being inserted may also be dynamically adjusted.

Step 506 assumes that there is some available bits in the instruction word to encode the delay field. If, however, an instruction word does not have space for the delay field, then a separate (single) instruction word containing multiple NOPs (i.e., a multicycle NOP instruction) may be inserted to realize the delay needed to avoid the hazard (see step 508). Step 508 need not be performed if the instruction word has sufficient bit width for the delay field. Alternatively, the solution of step 508 may be used instead of encoding the value in the embedded delay field (e.g., all instructions with a potential data hazard can be followed by a single or multi-cycle NOP operation).

In general, a single machine/program code may have some instructions that use the dedicated delay field, some instructions that require the separate multicycle NOP instruction, and other instructions that use a single bit for selectively enabling NOP insertion. In another arrangement, the machine code may have instructions with sufficient bit width to simply encode all the delay information in the delay fields. In yet another arrangement, the majority of instructions may have sufficient space for the delay field while only a few instructions need to be followed by a separate multi-cycle NOP instruction. If desired, any combination of these features can be implemented depending of the architecture of the lightweight processor core.

Figure 7:
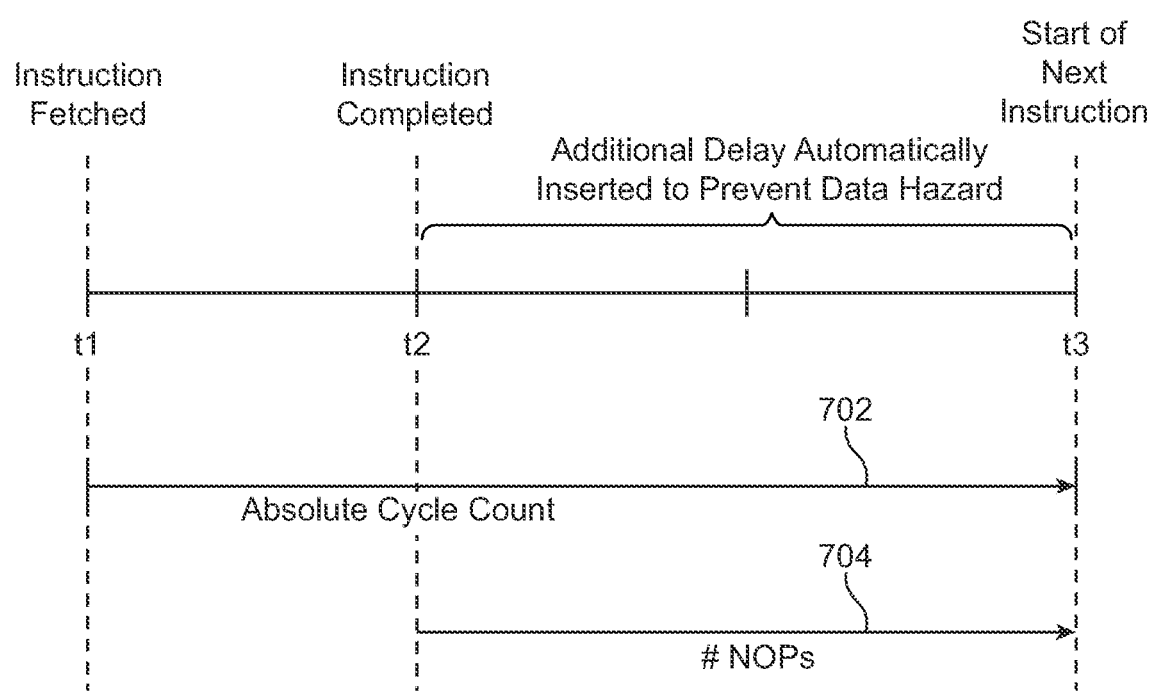
FIG. 7 is a timing diagram illustrating automatic insertion of additional delay for preventing a data hazard in accordance with an embodiment.

FIG. 7 is a timing diagram illustrating the automatic static insertion of additional delay for preventing a data hazard. As shown in FIG. 7, the amount of effectuated by the special delay field in the instruction word may be an absolute cycle count starting from the time the instruction is fetched (at time t1). In the example of FIG. 7, even though the instruction has completed at the end of the first cycle (at time t2), a delay bit value of 3 may cause two additional clock cycles of idle wait time after time t2 to prevent the data hazard, as indicated by arrow 702.

Alternatively, the instruction may complete at time t2 and be automatically followed by two NOPs, as indicated by arrow 704. The two NOPs may also be implemented as a single two-cycle NOP instruction. In yet other suitable arrangements, the delay field may encode a particular class of instruction. For example, a class-1 instruction may require a first number of delay, a class-2 instruction may require a second number of delay different than the first number of delay, a class-3 instruction may require a third number of delay different than the first and second numbers of delay, and so on. In each of these various delay schemes, the delay count can be simply monitored using a delay counter circuit in the processor core (see, e.g., delay counter 700 in FIG. 3). Whenever the requisite delay count or the number of NOPs has reached the predetermined delay threshold determined by the compiler to be sufficient to avoid the hazard, the next instruction can then safely proceed.

Figure 8:
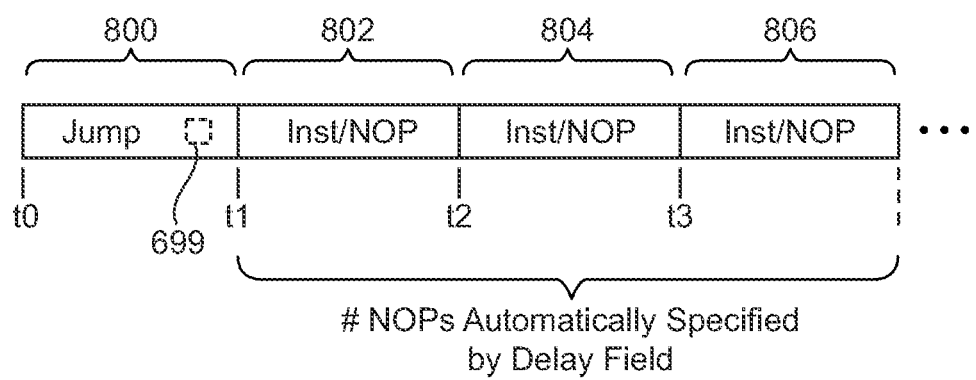
FIG. 8 is a diagram showing how a jump instruction can have a dedicated field specifying a number of no-operations (NOPs) following the jump instruction in accordance with an embodiment.

For jump/branch instructions, the special delay field may specify the requisite amount of delay for either a single-cycle branch delay slot or a multicycle branch delay slot. FIG. 8 is a diagram showing how a jump instruction 800 can have a dedicated field 699 specifying a number of NOPs following that jump instruction. As shown in FIG. 8, jump instruction 800 may occur during a first cycle from time t0 to t1. Jump instruction 800 may have a small embedded delay field 699 which specify how many NOPs are needed after the jump instruction. By a fixed property of the processor architecture, assume that that would be some number of branch delay slots available for use after the jump instruction.

In the example of FIG. 8, jump instruction 800 may be followed by a multicycle branch delay having a first slot 802, a second slot 804, and a third slot 806. In contrast to conventional methods that require using three instruction words to fill up three delay lots (which would take up a lot of program memory space), the special delay field in accordance with an embodiment can simply specify the number of desired NOPs to follow the jump so that (1) three NOPs are automatically inserted without paying for three words of memory or (2) at least some of the three slots are used for productive code by setting the number of NOPs to be some number less than three.

For example, the delay field can be set to a value of "3" to perform a jump followed by 3 NOPs (paying no extra instructions and getting no extra work done), to a value of "2" to perform a jump followed by 2 NOPs (while using 1 of the 3 available branch delay slots productively without paying for any NOP words), to a value of "1" to perform a jump followed by one NOP (while using 2 of the 3 available branch delay slots productively without paying for any NOP words), or to a value of "0" to perform a jump without any following NOPs (so that all of the 3 available branch delay slots are being used productively). This example may also apply to a single cycle branch delay slot or a multicycle branch delay slot with N slots (where N is any suitable integer greater than one).

Apart from inserting delay to mitigate hazards during program run time, modern processors often use forwarding multiplexers configured to allow values to skip ahead of their natural position in the register pipeline by receiving values from deeper down in the pipeline. In effect, the results of the deeper pipeline stages can be forwarded from the output of a recent computation and fed back directly to the top of the pipeline before they have time to propagate naturally back through the system. Operated in this way, forwarding multiplexers allow recent results to be more quickly available without waiting but incur the additional hardware cost of the forwarding multiplexers and the logic needed to control which feedback path to activate for the forwarding multiplexers. Moreover, the insertion of the forwarding multiplexers on the normal data path can also incur a fair amount of delay.

The use of the special delay field in the instruction word does not require any additional hardware for dynamic hazard prediction or prevention (i.e., the counter needed to pause as long as indicated by the delay bits is significantly cheaper than any circuitry that would have been used to decide during run time how long to wait for each instruction with a possible hazard). No forwarding multiplexing hardware is needed, which not only reduces area but also improves the maximum operating frequency. In effect, the use of the delay field can allow any instruction to last for a variable amount of time (e.g., by statically setting the value of the delay bits using the compiler or optionally dynamically adjusting the value of the delay bits by reconfiguring the programmable device).

Although use of the special delay field does not have the full advantage of forwarding (i.e., an instruction still has to wait for results to become available rather than forwarding or rerouting them from later in the pipeline), it is functionally correct. Assuming the software compiler has detailed awareness of where data is in the pipeline, the compiler would also be able to reorder instructions to help recover lost clock cycles.

Figure 9A:
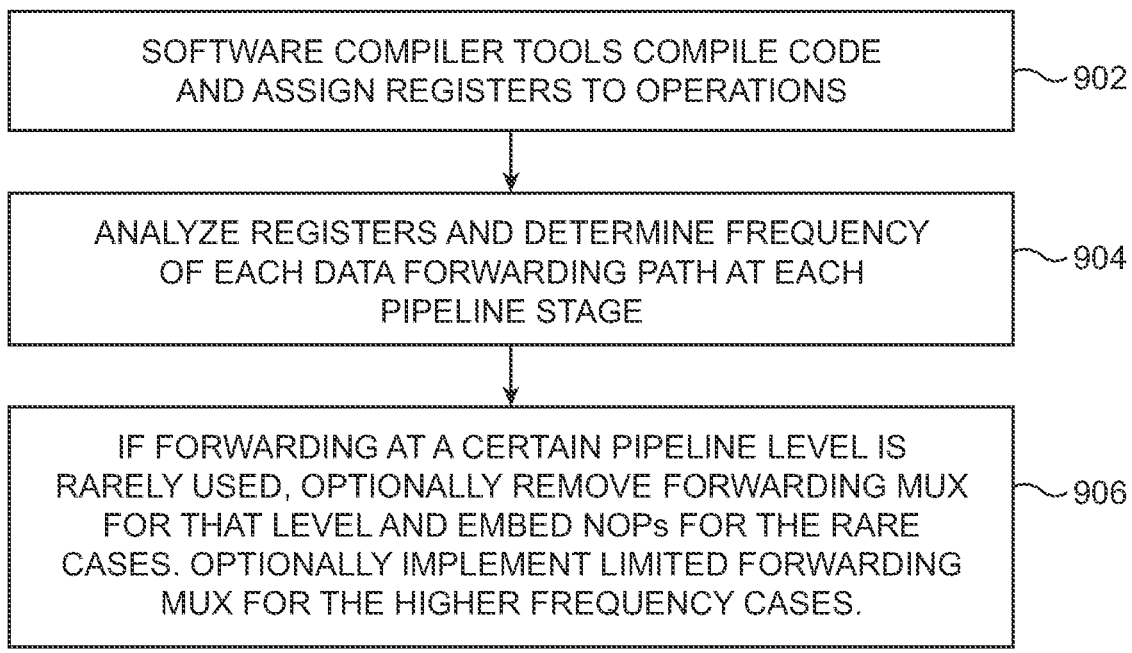
FIG. 9A is a flow chart of illustrative steps for implementing only a subset of data forwarding in accordance with an embodiment.

If desired, a subset of forwarding may be implemented. In accordance with another embodiment, the compiler may be used to analyze the use of forwarding in the pipeline. FIG. 9A is a flow chart of illustrative steps for implementing only a subset of data forwarding. At step 902, the compiler (e.g., compiler tool(s) 404 of FIG. 4) may compile the high-level source code and assign registers to program operations to obtain the low-level machine code.

At step 904, the compiler may analyze the assigned registers and determine the frequency of each forwarding opportunity (e.g., by analyzing the use of a forwarding path at each stage of the pipeline).

At step 906, if the compiler determines that forwarding from a certain level is rarely used, the forwarding multiplexer for that level can be removed and an embedded delay field used to insert the requisite number of NOPs to accommodate the rare situations where the pipeline needs to be temporarily halted. This would save both logic and improve device performance as the forwarding multiplexing logic would be much shallower. Alternatively, the compiler may choose to implement a limited forwarding mechanism. In other words, a processor may include forwarding multiplexers at only some of the pipeline levels where forwarding most frequency occurs.

Figure 9B:
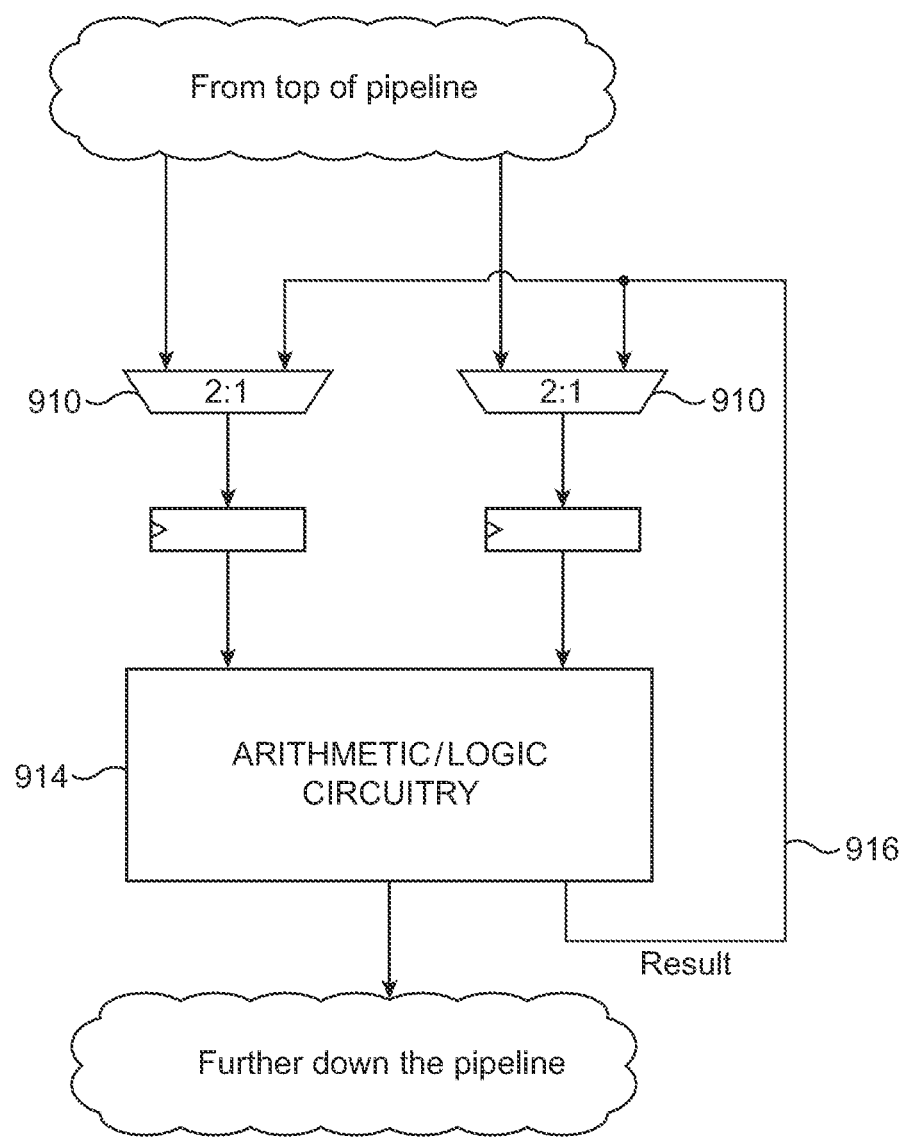
FIG. 9B is a diagram of an illustrative limited forwarding multiplexer in accordance with an embodiment.

In yet other suitable arrangements, smaller forwarding multiplexers may be implemented at any given level for only the most frequency used forwarding paths (see, e.g., FIG. 9B). As shown in FIG. 9B, fairly small forwarding multiplexers 910 (e.g., 2:1 multiplexers) may be implemented to forward or redirect data computed by arithmetic/logic circuitry 914 from only one stage deeper down in the pipeline via data forwarding path 916. In contrast, a conventional full forwarding approach may require a much larger forwarding multiplexer such as a 5:1 multiplexer which would forward/redirect values from among at least 5 stages deeper in the pipeline. The purpose of step 904 is for the compiler to realize that forwarding from four of the five deeper stages rarely occur, so it is possible to save on hardware cost by implementing forwarding hardware for only the most frequency used case(s).

The embodiments described herein are not limited to use in processor cores on a programmable integrated circuit. In general, the NOP insertion via the delay field embedded in the instruction word could be used for other applications as well. If external cache or non-local memory is used, different read instructions could be used to access the memory each of which could contain a different number of NOP cycles (e.g., each read instruction may have a special delay field specifying a desired number of NOP cycles following that read access). These variable length memory accesses could be used to expand the memory space available with a minimal amount of overhead.

In accordance with yet another suitable embodiment, the compiler may also be used to discover situations when certain instruction take a much shorter time than expected by recognizing that precursors are already available in the pipeline due to good fortune. This may be particularly useful for lightweight processor cores configured to issue instructions at fixed intervals (e.g., instructions are issued once every five cycles, once every six cycles, once every seven cycles, once every eight cycles, or at other suitable predetermined intervals). For example, consider a scenario where the program includes the following successive instructions:

$R0=R1$ xor $R2$ $R3=R1$ plus $R2$

. . .

Each of these instructions can last many clock cycles and can be issued many cycles apart from one another to avoid a data hazard (instead of being issued one after another in successive cycles). If these instructions were implemented on an FPGA, the layout of the arithmetic and logic circuitry in typical FPGA soft processors would most likely enable the results of R0 and R3 to be computed in parallel. In this example, the second instruction has the advantage that the inputs R1 and R2 have already been retrieved from the register file (during execution of the first instruction) and will therefore be processed by the adder. To complete the second instruction, only the adder output needs to be selected and then trigger the write to R3. In essence, the second instruction can safely be scheduled to occur very quickly in less time than that taken by any addition operation if starting from a blank slate. Such situation may occur fairly frequently and could be detected using the compiler during software compile time.

FIG. 10A is a diagram showing a series of illustrative load word instructions. In the example of FIG. 10A, a first instruction 1002 at address Add1 may perform a first load word (LDW) operation that reads from source register sp (e.g., a stack pointer register) plus a constant offset of 16 and then writes that recovered value to destination register ra. The second instruction 1004 at address Add2 may perform a second LDW operation that reads from source register sp plus a constant offset of 12 and then writes that recovered value to destination register r17. The third instruction 1006 at address Add3 may perform a third LDW operation that reads from source register sp plus a constant offset of 8 and then writes that recovered value to destination register r16. In other words, each LDW operation can be viewed as a series of micro-transactions including: (1) reading from the source register, (2) using arithmetic circuitry to add the offset value to the read result, (3) requesting memory at the summed location, and (4) writing the recovered memory value to the destination register. Assuming the series of micro-transactions can take up to 10 cycles to complete for each load word operation, a processor core executing instructions 1002, 1004, and 1006 might issue these instructions once every 10 cycles or more (as an example).

Here, the second and third LDW instruction calls have no need to execute the first (1) micro-transaction of reading from the source register file since the value from register sp is already available at the register file output from executing the first instruction 1002. Conventionally, there is no mechanism available in a traditional RISC processor to recognize this situation and skip over the first micro-transaction.

Figure 10B:
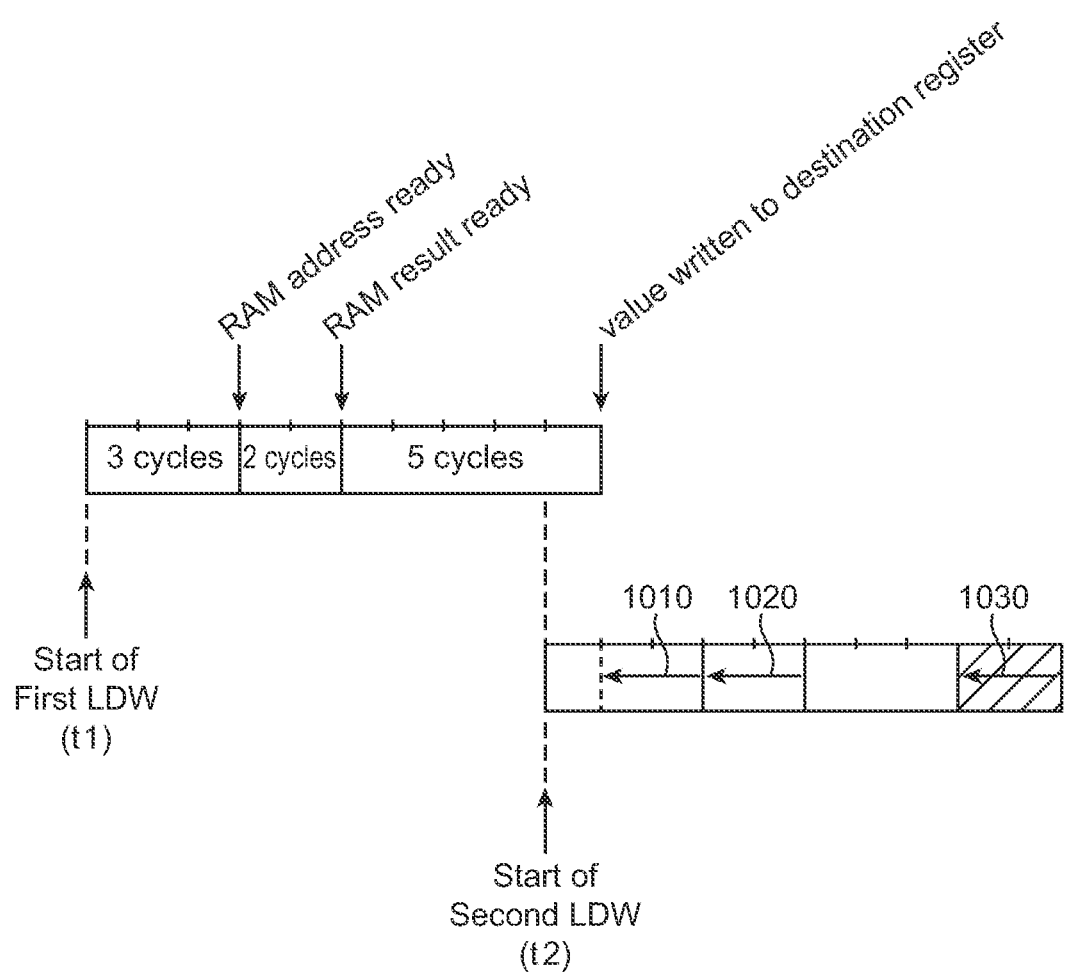
FIG. 10B is a diagram showing how a second load word instruction may be opportunistically shortened in accordance with an embodiment.

Such situations may be evident to the compiler. FIG. 10B is a diagram showing how the second load word instruction may be opportunistically shortened by the compiler. As shown in FIG. 10B, the instruction fetch for the first LDW operation may begin at time t1. After 3 cycles, the RAM address of the source register is ready. After another 2 cycles, the value of the source register may be read out. After another 5 cycles, the offset may be added to the read result and the final value written to the destination register. In this example, a typical load word operation would take 10 cycles.

For the second load word instruction, however, it is possible to take advantage of the existing partial propagation of RAM values to opportunistically recover one or more cycles. The instruction fetch for the second LDW operation may begin at time t2. Here, since the RAM address of the source register is already ready from the previous LDW instruction, all of the micro-transactions may be shorted by two cycles (see arrows 1010, 1020, and 1030). In other words, the second and third LDW instructions may be scheduled with a lower cycle count to improved performance and throughput (e.g., the second and third load word instructions that would typically take 10 cycles can now be performed in 8 cycles).

Figure 10C:
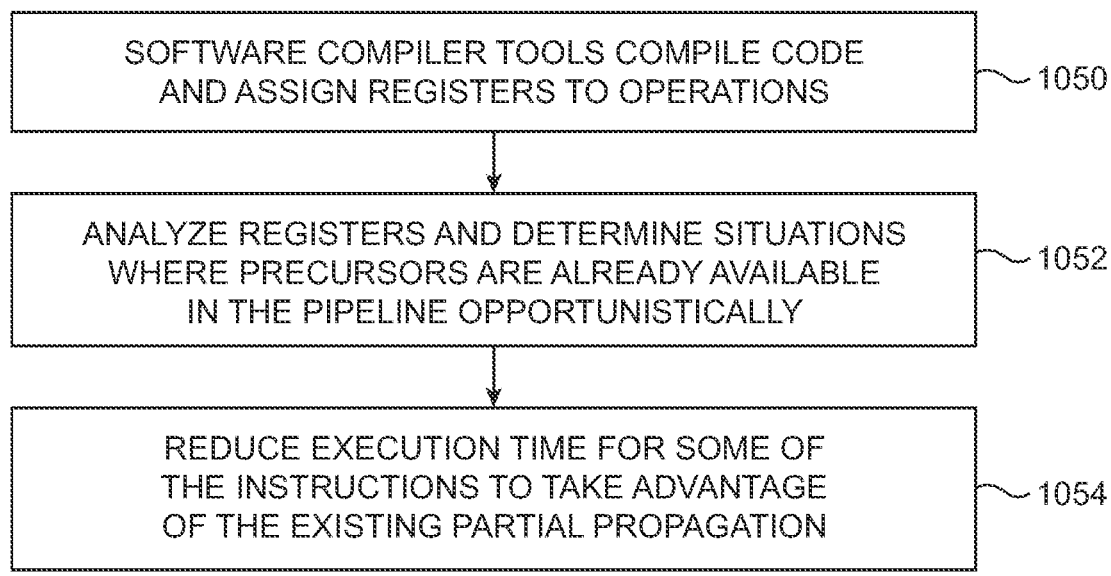
FIG. 10C is a flow chart of illustrative steps for opportunistically reducing instruction execution time in accordance with an embodiment.

FIG. 10C is a flow chart of illustrative steps for opportunistically reducing instruction execution time. At step 1050, the compiler (e.g., compiler tool(s) 404 of FIG. 4) may compile the high-level source code and assign registers to program operations to obtain the low-level machine code.

At step 1052, the compiler may analyze the assigned registers and detect situations where precursors are already available in the pipeline by good fortune (e.g., by detecting if required register values in the current operation have already been retrieved in an earlier instruction).

At step 1054, in response to detecting such situations, the compiler may reduce the execution time for some of these instructions to take advantage of the existing partial propagation of values in the pipeline. If desired, all of the instructions may be pulled back by the maximum possible number of cycles to optimize performance. In other suitable arrangements, only a selected subset of the instructions may be shortened (e.g., instructions with longer cycle times or instructions that can be shortened by two or more cycles).

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit, comprising: program memory; and a processor core configured to execute a plurality of instructions stored on the program memory, wherein at least one instruction in the plurality of instructions comprises a delay field having a value that specifies a number of no-operations (NOPs) to be inserted after the at least one instruction to avoid a data hazard.

Example 2 is the integrated circuit of example 1, wherein the value of the delay field optionally specifies that at least one NOP is inserted after the at least one instruction to avoid the data hazard.

Example 3 is the integrated circuit of example 1, wherein the value of the delay field optionally specifies that multiple NOPs are inserted after the at least one instruction to avoid the data hazard.

Example 4 is the integrated circuit of example 1, wherein the value of the delay field optionally specifies that zero NOPs are inserted after the at least one instruction.

Example 5 is the integrated circuit of any one of examples 1-4, wherein a first additional instruction in the plurality of instructions optionally does not have a delay field for preventing data hazard for the first additional instruction.

Example 6 is the integrated circuit of example 5, wherein a second additional instruction following the first additional instruction in the plurality of instructions optionally specifies multiple no-operations (NOPs) to prevent the data hazard for the first additional instruction.

Example 7 is the integrated circuit of any one of examples 1-6, wherein the at least one instruction optionally comprises a branch instruction with an associated branch delay slot, and wherein the delay field specifies whether the branch delay slot is filled by a no-operation (NOP) or another instruction in the plurality of instructions.

Example 8 is the integrated circuit of any one of examples 1-6, wherein the at least one instruction optionally comprises a branch instruction with multiple associated branch delay slots, and wherein the delay field specifies whether one or more of the multiple branch delay slots are filled by no-operations (NOPs) or other instructions in the plurality of instructions.

Example 9 is the integrated circuit of any one of examples 1-8, wherein the value of the delay field is optionally statically set by a compiler that generates a machine code containing the plurality of instructions.

Example 10 is the integrated circuit of any one of examples 1-9, wherein the processor core is at least optionally partially implemented using programmable logic, and wherein the value of the delay field is optionally dynamically adjustable.

Example 11 is the integrated circuit of any one of examples 1-10, wherein at least some of the plurality of instructions optionally uses forwarding logic.

Example 12 is the integrated circuit of example 11, wherein the forwarding logic optionally comprises forwarding multiplexers configured to receive signals from a deeper pipeline stage in the processor core.

Example 13 is the integrated circuit of any one of examples 1-12, optionally further comprising a counter circuit configured to count the number of inserted NOPs specified by the delay field to avoid the data hazard.

Example 14 is a method of implementing a processor, comprising: using a compiler to compile a source code by assigning registers to operations in the source code and to generate a corresponding machine code with a plurality of instruction words; analyzing the registers to detect a data hazard associated with the operations; determining an amount of delay that is required to remove the data hazard; encoding the amount of delay in a dedicated delay field in a given instruction word in the plurality of instruction words; and using the processor to execute the plurality of instruction words in the machine code.

Example 15 is the method of example 14, wherein the delay field is optionally statically set by the compiler.

Example 16 is the method of example 14, wherein the delay field is optionally dynamically adjustable.

Example 17 is the method of any one of examples 14-16, wherein the delay field optionally specifies that one or more no-operations (NOPs) has to be inserted after the given instruction word when using the processor to execute the machine code.

Example 18 is the method of any one of examples 14-17, wherein the given instruction word has an opcode portion and an operand portion, and wherein the delay field is optionally within an unused part of the opcode portion or the operand operation.

Example 19 is the method of any one of examples 14-18, optionally further comprising: determining whether a first additional instruction word in the plurality of instruction words results in a potential data hazard; and in response to determining that the first additional instruction results in a potential data hazard, using a second additional instruction word in the plurality of instruction words following the first additional instruction word to specify multiple no-operations (NOPs) to prevent the potential data hazard for the first additional instruction word.

Example 20 is a method of implementing a processor, comprising: using a compiler to compile a source code by assigning registers to operations in the source code and to generate a corresponding machine code having a first instruction immediately followed by a second instruction, wherein a second instruction is issued a predetermined number of clock cycles after the first instruction; analyzing the registers to detect a situation where a value required for the second instruction is already available due to execution of the first instruction; and in response to detecting that the value required for the second instruction is already available due to the execution of the first instruction, opportunistically reducing an execution time of the second instruction.

Example 21 is the method of example 20, wherein the predetermined number of clock cycles is optionally equal to or greater than two clock cycles.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
    program memory; and
    a processor core of a programmable logic device configured to execute a plurality of instructions stored on the program memory, the processor core having a pipeline with one or more pipeline levels, at least a first pipeline level having first forwarding logic based on a first determined forward frequency that the first forwarding logic is to be used by the processor core and at least a second pipeline level not having second forwarding logic based on a second determined forward frequency that the second forwarding logic is to be used by the processor core, wherein at least one instruction in the plurality of instructions comprises a NOP that comprises a delay field having a value encoded that indicates how often the NOP is to be inserted to avoid a data hazard, and the value is based at least in part on a frequency used in the programmable logic device.

2. The integrated circuit of claim 1, wherein the value of the delay field specifies that multiple NOPs are inserted into the pipeline of the processor core after the at least one instruction to avoid the data hazard.

3. The integrated circuit of claim 1, wherein a first additional instruction in the plurality of instructions does not have a delay field for preventing a data hazard for the first additional instruction.

4. The integrated circuit of claim 3, wherein a second additional instruction following the first additional instruction in the plurality of instructions specifies multiple NOPs to prevent the data hazard for the first additional instruction.

5. The integrated circuit of claim 1, wherein the at least one instruction comprises a branch instruction with an associated branch delay slot, and wherein the delay field specifies whether the branch delay slot is filled by the NOP or another instruction in the plurality of instructions.

6. The integrated circuit of claim 1, wherein the at least one instruction comprises a branch instruction with multiple associated branch delay slots, and wherein the delay field specifies whether one or more of the multiple branch delay slots are filled by NOPs or other instructions in the plurality of instructions.

7. The integrated circuit of claim 1, wherein the processor core is at least partially implemented using programmable logic, and wherein the value of the delay field is dynamically adjustable.

8. The integrated circuit of claim 1, wherein at least some of the plurality of instructions uses the first forwarding logic.

9. The integrated circuit of claim 8, wherein the first forwarding logic comprises forwarding multiplexers configured to receive signals from the first pipeline level, wherein the first pipeline level comprises a deeper pipeline stage in the processor core.

10. The integrated circuit of claim 1, further comprising:
a counter circuit configured to count a number of inserted NOPs specified by the delay field to avoid the data hazard.

11. The integrated circuit of claim 1, wherein the programmable logic device comprises a field programmable gate array (FPGA).

12. A method of implementing a processor, comprising:
using a compiler to compile a source code for a programmable logic device prior to run time by assigning registers to operations in the source code and to generate a corresponding machine code with a plurality of instruction words;
analyzing, by the compiler prior to run time, the registers to detect a data hazard associated with the operations;
determining, by the compiler, an amount of delay that is required to remove the data hazard;
determining, by the compiler, a forwarding frequency that forwarding circuitry of each level of a pipeline executed by the processor is to be used;
removing, by the compiler, the forwarding circuitry for one or more levels of the pipeline based on the forwarding frequency that the forwarding circuitry of the one or more levels is to be used;
encoding, by the compiler prior to run time, the amount of delay in a delay field in a NOP of a given instruction word in the plurality of instruction words to indicate how often to insert the NOP, wherein the amount of delay is based at least in part on a frequency used in the programmable logic device; and
using the processor to execute the plurality of instruction words in the machine code.

13. The method of claim 12, wherein the delay field is statically set by the compiler.

14. The method of claim 12, wherein the delay field is dynamically adjustable.

15. The method of claim 12, wherein the delay field specifies that one or more NOPs has to be inserted after the given instruction word when using the processor to execute the machine code.

16. The method of claim 12, wherein the given instruction word has an opcode portion and an operand portion, and wherein the delay field is within an unused part of the opcode portion or the operand operation.

17. The method of claim 12, further comprising:
determining whether a first additional instruction word in the plurality of instruction words results in a potential data hazard; and
in response to determining that the first additional instruction word results in a potential data hazard, using a second additional instruction word in the plurality of instruction words following the first additional instruction word to specify multiple NOP iterations to prevent the potential data hazard for the first additional instruction word.

18. A method of implementing a processor, comprising:
using a compiler to compile a source code for a programmable logic device prior to run time by assigning registers to operations in the source code and to generate a corresponding machine code having a first instruction immediately followed by a second instruction, wherein the second instruction is issued a number of clock cycles after the first instruction as indicated by a value of a delay field of a NOP indicating how often the NOP is to be inserted between the first and second instruction, and the value is based at least in part on a frequency used in the programmable logic device;
determining, by the compiler, a forwarding frequency that forwarding circuitry of each level of a pipeline executed by a processor core is to be used;
removing, by the compiler, the forwarding circuitry for one or more levels of the pipeline based on the forwarding frequency that the forwarding circuitry of the one or more levels is to be used;
analyzing, by the compiler prior to runtime, the registers to detect a situation where a value required for the second instruction is already available due to execution of the first instruction; and
in response to detecting that the value required for the second instruction is already available due to the execution of the first instruction, opportunistically reducing an execution time of the second instruction.

19. The method of claim 18, wherein the number of clock cycles is predetermined as equal to or greater than two clock cycles.

20. The method of claim 18, wherein the value of the delay field specifies that multiple NOPs are inserted into the pipeline of the processor core.

21. The method of claim 18, wherein a third instruction in the machine code does not have a delay field for preventing data hazard for the third instruction.

* * * * *